US008909041B2

(12) United States Patent
Ye et al.

(10) Patent No.: US 8,909,041 B2
(45) Date of Patent: Dec. 9, 2014

(54) METHOD AND APPARATUS FOR DETERMINING AN OPTICAL SIGNAL-TO-NOISE RATIO (OSNR) PENALTY

(75) Inventors: Yabin Ye, Munich (DE); Tong Wu, Shenzhen (CN); Sen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 13/486,821

(22) Filed: Jun. 1, 2012

(65) Prior Publication Data

US 2013/0028597 A1    Jan. 31, 2013

Related U.S. Application Data

(63) Continuation of application No. PCT/CN2011/077672, filed on Jul. 27, 2011.

(51) Int. Cl.
*H04B 10/00* (2013.01)
*H04B 10/079* (2013.01)

(52) U.S. Cl.
CPC ............... *H04B 10/07953* (2013.01)
USPC .............. 398/26; 398/28; 398/29; 398/147; 398/158

(58) Field of Classification Search
CPC .................. H04B 10/0795–10/0799
USPC ...................... 398/25–29, 147, 158
See application file for complete search history.

(56) References Cited

U.S. PATENT DOCUMENTS

| 6,008,916 | A * | 12/1999 | Khaleghi | 398/27 |
| 6,069,718 | A * | 5/2000 | Khaleghi | 398/27 |
| 7,054,553 | B2 * | 5/2006 | Chung et al. | 398/29 |
| 7,256,876 | B1 * | 8/2007 | Boroditsky et al. | 356/73.1 |

(Continued)

FOREIGN PATENT DOCUMENTS

| CN | 1240944 A | 1/2000 |
| CN | 1567804 | 1/2005 |
| CN | 1866794 | 11/2006 |
| EP | 1 736 806 A1 | 12/2006 |

OTHER PUBLICATIONS

English-language International Search Report and Notification of Transmittal of the International Search Report and the Written Opinion of the International Search Authority, issued by the State Intellectual Property Office, the P.R. China in International Application No. PCT/CN2011/077672, mailed May 17, 2012, (9 pages).

(Continued)

*Primary Examiner* — Agustin Bello
(74) *Attorney, Agent, or Firm* — Slater & Matsil, L.L.P.

(57) ABSTRACT

A method for determining an optical signal-to-noise ratio penalty as a measure for a quality of an optical signal transmitted via an optical link between a source optical node and a destination optical node in an optical network, the method includes collecting information of the optical link; determining a configuration parameter $P_{conf}$ of the optical link based on the information of the optical link; adjusting the configuration parameter $P_{conf}$ to an adjusted configuration parameter $P'_{conf}$ according to linear impairments in the optical link; and determining the optical signal-to-noise ratio penalty based on a non-linear function of the adjusted configuration parameter $P'_{conf}$, the non-linear function accounting for non-linear impairments in the optical link.

20 Claims, 6 Drawing Sheets

(56) References Cited

U.S. PATENT DOCUMENTS

| | | | |
|---|---|---|---|
| 7,414,711 B1* | 8/2008 | Boroditsky et al. | 356/73.1 |
| 7,558,478 B1 | 7/2009 | Harley et al. | |
| 7,773,207 B1* | 8/2010 | Boroditsky et al. | 356/73.1 |
| 7,873,283 B2* | 1/2011 | Akiyama et al. | 398/147 |
| 8,174,685 B2* | 5/2012 | Xia et al. | 356/73.1 |
| 8,433,192 B2* | 4/2013 | Frankel et al. | 398/16 |
| 8,611,741 B2* | 12/2013 | Feuer et al. | 398/26 |
| 8,644,659 B2* | 2/2014 | Fee | 385/27 |
| 2002/0163683 A1 | 11/2002 | Antoniades et al. | |
| 2003/0011835 A1* | 1/2003 | Elbers et al. | 359/110 |
| 2003/0090755 A1* | 5/2003 | Chung et al. | 359/110 |
| 2004/0052522 A1* | 3/2004 | Fishteyn et al. | 398/29 |
| 2004/0161233 A1* | 8/2004 | Zalevsky et al. | 398/26 |
| 2004/0247319 A1* | 12/2004 | Melman | 398/65 |
| 2005/0244154 A1* | 11/2005 | Dinu et al. | 398/33 |
| 2006/0263085 A1* | 11/2006 | Antona et al. | 398/25 |
| 2010/0008663 A1* | 1/2010 | Gottwald | 398/26 |
| 2010/0253936 A1* | 10/2010 | Xia et al. | 356/73.1 |
| 2010/0322622 A1* | 12/2010 | Shukunami et al. | 398/26 |
| 2012/0063772 A1* | 3/2012 | Dahan et al. | 398/26 |
| 2012/0076502 A1* | 3/2012 | Swanson et al. | 398/136 |
| 2012/0170929 A1* | 7/2012 | Xie et al. | 398/33 |
| 2012/0201533 A1* | 8/2012 | Gariepy et al. | 398/26 |
| 2013/0028597 A1* | 1/2013 | Ye et al. | 398/26 |
| 2013/0330071 A1* | 12/2013 | He et al. | 398/16 |
| 2014/0029937 A1* | 1/2014 | Shi et al. | 398/26 |

OTHER PUBLICATIONS

Jean-Cristophe Antona et al., "Physical design and performance estimation of heterogeneous optical transmission systems", ScienceDirect, C.R. Physique 9, pp. 963-984 (2008).

Edouard Grellier et al., "Revisiting the evaluation of non-linear propagation impairments in highly dispersive systems", ECOC Paper 10.4.2, Vienna, Austria (Sep. 2009).

International Telecommunication Union, "Proposal of suggestions on procedures to build physical impairments models for signal quality evaluation in G.680", Telecommunication Standardization Sector, Study Period 2009-2012, pp. 1-2 (2010).

M. Yannuzzi et al., "Performance of translucent optical networks under dynamic traffic and uncertain physical-layer information", Technical University of Catalonia (Spain), Telecom Italia (Italy), Politecnico di Milano (Italy), Pirelli Labs (Italy), CoreCom (Italy), 6 pages (2009).

Cardillo, Rocco, et al., "Considering Transmission Impairments in Wavelength Routed Networks," Conference on Optical Network Design and Modeling, Feb. 7-9, 2005, pp. 421-429.

Extended European Search Report received on Application No. 11833582.7-1860, Applicant: Huawei Technologies Co., Ltd., mailed Aug. 20, 2013, 8 pages.

Pachnicke, Stephan et al., "Novel Physical-Layer Impairment-Aware Routing Algorithm for Translucent Optical Networks with 43 Gb/s and 107 Gb/s Channels," Transparent Optical Networks, Jun. 28-Jul. 2, 2009, 4 pages.

Roberts, Kim, et al., "Performance of Dual-Polarization QPSK for Optical Transport Systems," Journal of Lighwave Technology, vol. 27, No. 16, Aug. 15, 2009, 14 pages.

Saradhi, Chava Vijaya, et al., "Physical Layer Impairment Aware Routing (PLIAR) in WDM Optical Networks; Issues and Challenges," IEEE Communications Surveys & Tutorials, vol. 11, No. 4, Fourth Quarter 2009, pp. 109-130.

* cited by examiner $$\phi_{NL(total)} = \sum_{span=1}^{i} \frac{2\pi}{\lambda} \left( \frac{n_2 P_i L_{eff}}{A_{eff}} \bigg|_{Line} + \frac{n_2 P_i L_{eff}}{A_{eff}} \bigg|_{DCF} \right)$$

PENALTY:

$$\epsilon = AL^2 + BL^4$$

Maximum span length: 85 km

Number of spans $N_{SPAN} = 2 + 4 + 7 = 13$ $P_0$: Power level at the signal launch [dBm]: 3

OSNRend: OSNR at receiver[dB]: 23.6

$a_0$: 0.4

$a_1$: 0.96

$a_2$: -0.041

$a_3$: 0.02

B: 0.2

$$Q_{end} = a_0 + a_1 OSNR_{end} + a_2 N_{SPAN} + a_3 (P_0 N_{SPAN})^B$$

$Q_{end} = 22.6\ dB$

METHOD AND APPARATUS FOR DETERMINING AN OPTICAL SIGNAL-TO-NOISE RATIO (OSNR) PENALTY

CROSS-REFERENCE TO RELATED APPLICATIONS

This application is a continuation of PCT Application No. PCT/CN2011/077672, filed on Jul. 27, 2011, entitled "Method and apparatus for determining an optical signal-to-noise ratio (OSNR) penalty", which is hereby incorporated herein by reference.

BACKGROUND OF THE INVENTION

The present invention relates to a method and apparatus for determining an optical signal-to-noise ratio (OSNR) penalty in an optical network. The OSNR penalty serves as a measure for a quality of an optical signal transmitted via an optical link between a source optical node and a destination optical node In transparent optical networks, the optical signal quality is affected by different impairments like chromatic dispersion (CD), amplifier stimulated emission (ASE) noise, crosstalk, polarization mode dispersion (PMD), self-phase modulation (SPM), cross-phase modulation (XPM), four wave mixing (FWM), etc. When optical networks are designed, the operators need to have knowledge about the network behavior, for example, dimension geographical positions of network nodes, distance between network nodes, signal launching powers, amplifier spans, number of amplifiers and further network related parameters. Therefore, it is important to predict the signal quality even before the signal is set up. In order to evaluate the signal quality, there are generally two ways:

One way is based on full numerical simulation by solving the nonlinear Schrödinger equations for signal transmission in optical fibers. However, this method takes too much time, which cannot fulfill the time requirements for fast network design and real time signal quality evaluation.

The other way is to abstract some parameters for the transmission link and to represent the signal quality by these parameters with some functions.

SUMMARY OF THE INVENTION

It is the object of the invention to provide a method for assessing the quality of an optical signal in high speed transmission systems.

In general, the optical impairments affecting the signal quality can be separated into two categories, which are linear impairments and nonlinear impairments. Chromatic dispersion (CD), insertion loss, amplified spontaneous emulation (ASE) noise, crosstalk, polarization mode dispersion (PMD), polarization dependent loss (PDL), etc. belong to the first category, while the self-phase modulation (SPM), cross-phase modulation (XPM), four-wave mixing (FWM), Stimulated Brillouin Scattering (SBS), and Stimulated Raman Scattering (SRS) belong to the second one. The International Telecommunication Union, Telecommunication Standardization Sector (ITU-T) has defined in Recommendation G.680 some linear impairments that need to be considered for signal quality evaluation. However, to correctly evaluate the quality of an optical signal, not only linear impairments should be included, but also the interactions between linear and non-linear impairments have to be considered.

For linear transmission where the launch power of the optical signal is low enough that none of the nonlinear impairments in optical fibers is taking effect, the impact of the linear impairments on the signal quality is relatively easy to be modelled. For example, the impact of Chromatic Dispersion (CD) can be modelled by considering the total residual Chromatic Dispersion at the end of the transmission link; analogously the impact of Polarization Mode Dispersion (PMD) can be modelled by considering the total accumulated Polarization Mode Dispersion at the end of the transmission link. However, in case of nonlinear transmission, where the launch power of the optical signal is high enough that some of the nonlinear impairments begin to have effect on the signal quality, the models describing only the linear impairments can no longer be applied for correctly evaluating the signal quality.

The invention provides a fast method and apparatus for assessing the quality of an optical signal by considering the interactions between linear and non-linear impairments in the optical transmission link. According to an embodiment, the invention is directed to a method for determining an optical signal-to-noise ratio (OSNR) penalty as a measure for a quality of an optical signal transmitted via an optical link between a source optical node and a destination optical node in an optical network. The method comprises: collecting information of the optical link; determining a configuration parameter $P_{conf}$ of the optical link based on the information of the optical link; adjusting the configuration parameter $P_{conf}$ to an adjusted configuration parameter $P'_{conf}$ according to linear impairments in the optical link; and determining the optical signal-to-noise ratio penalty based on a non-linear function of the adjusted configuration parameter $P'_{conf}$, the non-linear function accounting for non-linear impairments in the optical link.

The Optical Signal-to-Noise Ratio (OSNR) is the ratio of the optical signal power versus the noise power. Physical impairments, both linear and non-linear degrade the Optical Signal-to-Noise Ratio. When the impairments accumulated along a route are excessively high, light-paths cannot be established, so connection requests are blocked. Optical Signal-to-Noise Ratio at the receiver end is the most relevant parameter to characterize noise-related system degradation: it refers to the ratio of the channel signal power divided by the optical noise power (integrated over reference bandwidth, usually 0.1 nm). OSNR is a cumulative parameter since the inverses of the OSNR degradations of different parts of the system can be added to get the inverse of the overall OSNR. When the impairments accumulated along a route are excessively high, it cannot be guaranteed that the signal detection at destination occurs with a Bit Error Rate (BER) lower than a certain threshold. When the Bit Error Rate lies above that threshold, light paths cannot be established, so connection requests are blocked.

To account for non-noise system impairments, the notion of OSNR penalty is used. For a reference Bit Error Rate (BER), it represents the excess OSNR required after transmission to get this reference BER, with respect to the requirements in the so-called "back-to-back" configuration, i.e. when transmitter and receiver are directly connected, without transmission. In other words, the OSNR penalty is the difference in sensitivity (in dB scale) after and before transmission for the same reference BER.

In order to describe the invention in detail, the following terms, abbreviations and notations will be used:

ON: Optical Network, also called OTN: Optical Transport Network.

WDM: Wavelength Division Multiplexing.

Transparent OTN: Transparent Optical Transport Network.

OSNR: Optical Signal-to-Noise Ratio. Ratio of the optical signal power versus the noise power. Physical impairments, both linear and non-linear degrade the Optical Signal-to-Noise Ratio (OSNR).

BER: Bit Error Rate.

Regenerator: Devices that regenerate the optical signal.

RWARP: Routing and Wavelength Assignment and Regenerator Placement.

ASE: Amplified Spontaneous Emission.

OSNR penalty: measure for impairments of the OSNR due to non-noise effects.

CD: Chromatic Dispersion.

GVD: Group Velocity Dispersion.

SMF: Single-Mode Fiber.

G.652 type according to ITU-T (International Telecommunication Union-Telecommunication) standardization body)

LEAF: Large-Effective Area Fiber.

G.655 Non-Zero Dispersion Shifted Fiber type.

DCF: Dispersion Compensating Fibers.

Non-linear impairments:

Non-linear impairments can be divided into two categories, those stemming from electronic non-linearities, namely the Kerr effect, and those stemming from atomic/molecular/material non-linearities, namely Stimulated Brillouin Scattering (SBS), core electrostriction, and inter-channel Self-Induced Stimulated Raman Scattering (SI-SRS).

SBS: Stimulated Brillouin Scattering.
A non-linear impairment stemming from atomic/molecular/material non-linearities.

SI-SRS: Self-Induced Stimulated Raman Scattering.
A non-linear impairment stemming from atomic/molecular/material non-linearities.

Kerr effect: a non-linear impairment stemming from electronic non-linearities.

SPM: Self-Phase Modulation. A type of Kerr non-linearity.

XPM: Cross-Phase Modulation. A type of Kerr non-linearity.

FWM: Four-Wave Mixing. A type of Kerr non-linearity.

Signal-Noise nonlinear interactions: A type of Kerr non-linearity.
Also called Parametric-Gain or Modulation-Instability for intensity-modulated systems.

Linear impairments:
Linear impairments result from filtering due to optical nodes, chromatic dispersion (CD), insertion loss, amplified spontaneous emulation (ASE) noise, crosstalk, polarization mode dispersion (PMD), polarization dependent loss (PDL) etc.

PMD: Polarization Mode Dispersion. Is a linear impairment.

SOP: State of Polarization, polarization state.

The shape traced out in a fixed plane by the electric vector as such a plane wave passes over it is a description of the polarization state.

According to a first aspect, the invention relates to a method for determining an optical signal-to-noise ratio (OSNR) penalty as a measure for a quality of an optical signal transmitted via an optical link between a source optical node and a destination optical node in an optical network, the method comprising: collecting information of the optical link; determining a configuration parameter $P_{conf}$ of the optical link based on the information of the optical link; adjusting the configuration parameter $P_{conf}$ to an adjusted configuration parameter $P'_{conf}$ according to linear impairments in the optical link; and determining the OSNR penalty based on a non-linear function of the adjusted configuration parameter $P'_{conf}$, the non-linear function accounting for non-linear impairments in the optical link.

The quality measure of the optical signal is improved when not only linear or non-linear impairments in the optical link are evaluated. By considering the interaction between the linear and the non-linear impairments, the quality measure is of higher accuracy. Determining a configuration parameter $P_{conf}$ which is based on information of the optical link makes the method simple and fast, as optical link information is available to the operator when the optical network is to be planned.

In a first possible implementation form of the method according to the first aspect, the configuration parameter $P_{conf}$ of the optical link corresponds to an accumulated power along the optical link causing a predetermined degradation of the optical signal.

By transmission through an optical link the optical signal is degraded. When the link parameters of the optical link are known, the operator can predict the degradation of the optical signal. If the accumulated power along the optical link is low, linear impairments in the optical link mainly cause the degradation of the optical signal. If the accumulated power along the optical link is high, non-linear impairments in the optical will be responsible for the degradation of the optical signal. The operator can control by the configuration parameter whether the optical network runs in the linear-impairment range or in the non-linear impairment range. In the first case, the optical network can deliver information of high precision. In the second case, the optical network can serve a great number of communication links.

In a second possible implementation form of the method according to the first aspect as such or according to the first implementation form of the first aspect, the predetermined degradation of the optical signal corresponds to a predetermined optical signal-to-noise ratio (OSNR) penalty at a predetermined bit error rate.

By choosing a predetermined or specified optical signal-to-noise ratio (OSNR) penalty at a predetermined bit error rate, the quality of one optical link can be compared to the quality of another optical link in this network or in another network. The method provides a reference for designing, testing and comparing optical networks In a third possible implementation form of the method according to the first aspect as such or according to any of the preceding implementation forms of the first aspect, the optical signal-to-noise ratio (OSNR) penalty is determined as an additional optical signal-to-noise ratio of the optical signal required after transmission of the optical signal via the optical link compared to a back-to-back transmission of the optical signal.

By this definition, only effects of the optical transmission link are considered without the impacts on the optical signal in the optical nodes which are for example pulse shaping and delaying due to transmission, multiplexing, demultiplexing and reception.

In a fourth possible implementation form of the method according to the first aspect as such or according to any of the preceding implementation forms of the first aspect, the optical signal-to-noise ratio penalty is determined based on the non-linear function of the adjusted configuration parameter $P'_{conf}$ and based on the linear impairments in the optical link.

Signal quality degradation is due to linear and non-linear impairments. An optical signal impaired by linear impairments in the optical fiber is subject to non-linear impairments in a succeeding section of the optical fiber in such a manner that linear impairments and non-linear impairments interact with each other. By adjusting the configuration parameter $P_{conf}$ to the adjusted configuration parameter $P'_{conf}$ according to the linear impairments, these linear degradations are considered in the determination of the non-linear impairments. Therefore, the method determines the non-linear impairments interacting with the linear impairments. By additionally determining the OSNR penalty based on the linear impairments, not only the influence of non-linear impairments but also the influence of the linear impairments is considered. Thus, a precision of the method is improved with respect to methods which concentrate on effects due to pure non-linear impairments or due to pure linear impairments.

In a fifth possible implementation form of the method according to the first aspect as such or according to any of the preceding implementation forms of the first aspect, the information of the optical link comprises fiber parameters of optical fibers in the optical link, a number of wavelength division multiplexed channels in the optical link, a number of optical nodes in the optical link and launching powers of the wavelength division multiplexed channels.

The characteristics of an optical transmission system can be described by the optical link parameters which are the fiber parameters, the number of WDM channels, the number of optical nodes in the link and the launching powers of the channels and others. These parameters are configuration parameters which are known to the operator when designing an optical network. The accuracy of the quality measure mainly depends on the accuracy of the model on which the calculations of the operator are based. When this model considers non-linear impairments and linear impairments as well as interactions between them, the precision of the quality measuring is improved with respect to quality measures which are solely based on linear or non-linear impairments.

In a sixth possible implementation form of the method according to the first aspect as such or according to any of the preceding implementation forms of the first aspect, the linear impairments comprise at least one of impairments due to filtering within the optical link, impairments due to polarization mode dispersion along the optical link, impairments due to chromatic dispersion along the optical link, impairments due to insertion loss, impairments due to amplified spontaneous emulation noise, impairments due to crosstalk and impairments due to polarization dependent loss.

There are different types of linear impairments. The method considers at least one of these impairments. When only one of the linear impairments is considered, the method is easy and fast to perform. Considering more than one of the linear impairments as indicated above improves an accuracy of the quality measure determined by the method. In an implementation form, the main source/s of linear impairment is/are used.

In a seventh possible implementation form of the method according to the first aspect as such or according to any of the preceding implementation forms of the first aspect, the non-linear function of the adjusted configuration parameter $P'_{conf}$ accounts for at least one of non-linear impairments due to self-phase modulation, non-linear impairments due to cross-phase modulation, non-linear impairments due to four-wave mixing, non-linear impairments due to stimulated Brillouin scattering and non-linear impairments due to stimulated Raman scattering.

There are different types of non-linear impairments. The method considers at least one of these impairments. When only one of the non-linear impairments is considered, the method is easy and fast to perform. Considering more than one of the non-linear impairments as indicated above improves an accuracy of the quality measure determined by the method. In an implementation form, the main source/s of non-linear impairment is/are used.

In an eighth possible implementation form of the method according to the seventh implementation form of the first aspect, the optical link comprises optical fibers according to ITU-T recommendation G.652.

Optical fibers according to ITU-T recommendation G.652 are standardized and so information of the optical link is easy to collect by reading from the standard. The OSNR penalty of one optical link of an optical network supporting G.652 fibers may be compared to the OSNR penalty of another optical link of the same or another optical network supporting G.652 fibers. When the method is implemented in optical networks supporting G.652 fibers, the OSNR penalty can be accurately determined, because configuration parameters for G.652 fibers are well known from the ITU-T standardization documents.

In a ninth possible implementation form of the method according to the first aspect as such or according to any of the preceding implementation forms of the first aspect, the optical link comprises regenerators and spans which are portions of the optical link between two regenerators; and wherein the non-linear function of the adjusted configuration parameter $P'_{conf}$ depends on the adjusted configuration parameter $P'_{conf}$, on a number of the spans $N_{span}$ and on a power level $P_i$ at a launching of the optical signal.

The number of spans and the launching power levels are design parameters of the optical link and can thus be easily provided. Therefore, the method is simple to perform and requires only little computation resources.

In a tenth possible implementation form of the method according to the first aspect as such or according to any of the preceding implementation forms of the first aspect, the optical signal-to-noise ratio penalty is determined according to a formula: OSNR_Penalty=$f(N_{span}, P_i, P'_{conf})$+Penalty$_{filters}$+Penalty$_{PMD}$, wherein OSNR_Penalty defines the optical signal-to-noise ratio penalty, $f()$ the non-linear function, $N_{span}$ the number of spans, $P_i$ the power level at the launching of the optical signal, $P'_{conf}$ the adjusted configuration parameter, Penalty$_{filters}$ the linear impairments due to filtering within the optical link and Penalty$_{PMD}$ the linear impairments due to accumulated polarization mode dispersion.

The formula may be applied to different kinds of non-linear impairments, wherein the non-linear function characterizes the non-linear impairment. When the non-linear impairment is due to self-phase modulation (SPM), a non-linear function describing the SPM is applied. When the non-linear impairment is due to cross-phase modulation (XPM), a non-linear function describing the XPM is applied. When the non-linear impairment is due to another kind of non-linear effect, a non-linear function describing that effect is applied.

In an eleventh possible implementation form of the method according to the first aspect as such or according to any of the preceding implementation forms of the first aspect, the adjusting the configuration parameter $P_{conf}$ comprises at least one of subtracting an adjustment $\Delta P_f$ related to filtering within the optical link from the configuration parameter $P_{conf}$, adding an adjustment $\Delta P_{PMD}$ related to an accumulated polarization mode dispersion along the optical link to the configuration parameter $P_{conf}$ and adding an adjustment $\Delta P_{CD}$ related to an accumulated chromatic dispersion along the optical link to the configuration parameter $P_{conf}$.

As the configuration parameter $P_{conf}$ can be defined as the accumulated power along the optical link causing a predetermined degradation of the optical signal, adjusting the configuration parameter according to linear impairments can easily performed by adding adjustments related to the linear impairments. The adjustments can be independently added, i.e. subtracting an adjustment $\Delta P_f$ related to filtering within the optical link is independent from adding an adjustment $\Delta P_{PMD}$ related to accumulated polarization mode dispersion (PMD) and adding an adjustment $\Delta P_{CD}$ related to accumulated chromatic dispersion (CD). Only one of these adjustments can be considered or depending on their impairment strength more than one of those adjustments due to linear impairments can be applied. Both, the accumulated polarization mode dispersion (PMD) and the accumulated chromatic dispersion (CD) along the optical link cause a broadening of the optical pulse. Therefore, the adjustments $\Delta P_{PMD}$ related to PMD and $\Delta P_{CD}$ related to CD are added to the configuration parameter $P_{conf}$ in order to model the correct behavior of the optical link. In contrast, the adjustment $\Delta P_f$ related to filtering within the optical link causes a reduction of the optical pulse due to windowing effects of the linear filters. Therefore, the adjustment $\Delta P_f$ related to filtering is subtracted from the configuration parameter $P_{conf}$ in order to model the correct behavior of the optical link.

According to a second aspect, the invention relates to an apparatus for determining an optical signal-to-noise ratio penalty as a measure for a quality of an optical signal transmitted via an optical link between a source optical node and a destination optical node in an optical network, comprising a collecting unit configured for collecting information of the optical link; a first determining unit configured for determining a configuration parameter $P_{conf}$ of the optical link based on the information of the optical link; an adjusting unit configured for adjusting the configuration parameter $P_{conf}$ to an adjusted configuration parameter $P'_{conf}$ according to linear impairments in the optical link; and a second determining unit configured for determining the optical signal-to-noise ratio penalty based on a non-linear function of the adjusted configuration parameter $P'_{conf}$, the non-linear function accounting for non-linear impairments in the optical link.

The quality measure of the optical signal is improved when not only linear or non-linear impairments in the optical link are evaluated. By considering the interaction between the linear and the non-linear impairments, the quality measure is of higher accuracy. Determining a configuration parameter $P_{conf}$ which is based on information of the optical link makes the method simple and fast, as optical link information is available to the operator when the optical network is to be planned. The apparatus can be applied as a separate device before enrollment of an optical network, for example as a planning or management unit to help the operator designing the optical network. Alternatively or additionally, the apparatus can be a part of the optical network, for example in a qualification unit for supervising the quality of the optical network or of individual optical links in the network.

In a first possible implementation form of the apparatus according to the second aspect, the apparatus provides configuration information for configuring an optical link within the optical network by using wavelength division multiplexed channels, optical fibers and optical nodes of the optical network such that the optical signal-to-noise ratio penalty is below a threshold.

By applying the apparatus for designing an optical network, the apparatus can provide information how to design the optical network and the optical links including information about number of WDM channels, kind of optical fibers, number and position of optical nodes. When following the configuration information, the optical network is designed such that an OSNR penalty is below a configurable threshold, e.g. a threshold for detecting the minimum OSNR penalty. The configuration information can also be used for reconfiguring the network components, for example when an existing network is enhanced due to a new generation of fiber cables, regenerators or optical nodes. In such a case, the optical links can be reconfigured in such a manner that the OSNR penalty remains as low as desired, at least below a predetermined or configurable threshold.

In a second possible implementation form of the apparatus according to the first implementation form of the second aspect, the optical signal-to-noise ratio penalty is minimized when switching of optical cross connects into the optical link and/or reconfiguration of reconfigurable optical add and drops within the optical link is based on the configuration information.

Switching of optical cross connects into the optical link and/or reconfiguration of reconfigurable optical add and drops within the optical link can be performed in the field. The configuration information can be used for controlling the reconfiguration and/or switching such that quality of the optical signal remains as high as desired. Switching and reconfiguration can also be performed offline, i.e. during simulations and/or during planning of the optical network.

The invention can be applied to fixed networks. The invention can further be used for interconnecting network nodes by optical fibers, e.g. base stations, radio network controllers and network management units in fixed or/and mobile networks.

The invention can be used for optical network design and for optical channel signal power adjustment. The invention can be implemented in the optical network control plane.

The invention can be implemented in digital electronic circuitry, or in computer hardware, firmware, software, or in combinations thereof.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone and mouse), and a display controller for controlling a monitor. Additionally, the computer may include a floppy disk drive; other removable media magneto optical media); and a hard disk or other fixed high-density media drives, connected using an appropriate device bus such as a SCSI (small computer system interface) bus, and Enhanced IDE (integrated drive electronics) bus, or an Ultra DMA (direct memory access) bus. The computer may also include a compact disk reader, a compact disk reader/writer unit, or a compact disc jukebox, which may be connected to the same device bus or to another device bus.

The invention envisions at least one computer readable medium. Examples of computer readable media include compact discs, hard disks, floppy disks, tape, magneto optical disks, PROMs, for example, EPROM, EEPROM, Flash EPROM, DRAM, SRAM, SDRAM. Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth. Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

BRIEF DESCRIPTION OF THE DRAWINGS

Further embodiments of the invention will be described with respect to the following figures, in which.

DETAILED DESCRIPTION OF EMBODIMENTS
OF THE INVENTION

Figure 1:
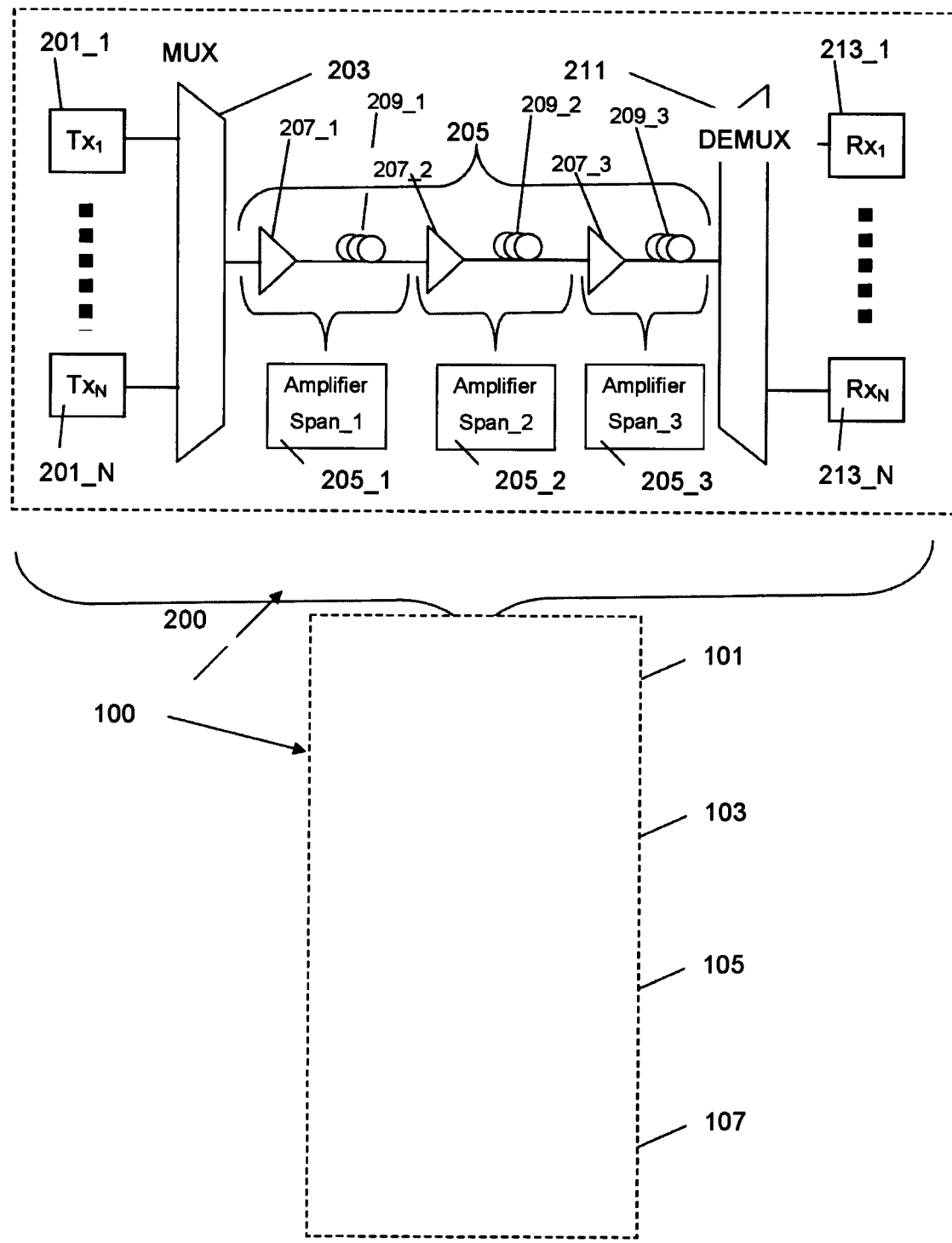
FIG. 1 shows a block diagram of a method for determining an optical signal-to-noise ratio penalty in an optical network according to an implementation form.

FIG. 1 shows a block diagram of a method for determining an optical signal-to-noise ratio penalty in an optical network according to an implementation form. The optical signal-to-noise ratio penalty is a measure for a quality of an optical signal transmitted via an optical link between a source optical node and a destination optical node in an optical network 200.

The optical network 200 comprises a plurality of N optical transmitters 201_1, . . . , 201_N generating N individual optical signals which are multiplexed in a multiplexer 203 into a single multiplexed optical signal. The multiplexed optical signal passes an optical transmission link 205 comprising an exemplary number of three amplifier spans 205_1, 205_2 and 205_3 including optical amplifiers 207_1, 207_2 and 207_3 and optical fibers 209_1, 209_2 and 209_3. At the receiving end a demultiplexer 211 demultiplexes the received multiplexed optical signal into N individual optical receive signals which are switched to a plurality of N optical receivers 213_1, 213_2 and 213_3.

The source optical node comprises the plurality of N optical transmitters 201_1, . . . , 201_N and the multiplexer 203. The destination optical node comprises the demultiplexer 211 and the plurality of N optical receivers 213_1, 213_2 and 213_3.

The optical network 200 consists of the optoelectronic transmitters 201_1, . . . , 201_N followed by the optical transmission link, and by the optoelectronic receivers 213_1, 213_2 and 213_3. The transmitters 201_1, . . . , 201_N convert binary data into a modulated optical signal at a given bit-rate on a given optical carrier wavelength, usually denoted as a channel, that is sent into an optical transmission link. The transmission link is primarily composed of a concatenation of sections 205_1, 205_2, 205_3 of single-mode optical fibers 209_1, 209_2, 209_3 and optical amplifiers 207_1, 207_2, 207_3, and conveys the signal to an optoelectronic receiver 213_1, . . . , 213_N, which recovers the binary information after photo-detection around the carrier wavelength and signal sampling.

In an implementation form, the optical network 200 comprises Wavelength Division Multiplexing (WDM) channels. The WDM technique is based upon combining (multiplexing) into the same fiber N modulated channels, each being at a different carrier wavelength. The total throughput is the sum of the individual channel bit rates, which are usually identical, e.g. throughput=N×10 Gb/s. At the receiver side, each channel is filtered and recovered separately, so that any limitations on fiber propagation arising from linear effects in the fiber, such as noise sensitivity, Group Velocity Dispersion and Polarization Mode Dispersion (PMD), are only related to the bit rate of each individual channel. WDM is therefore a very efficient and common way to exploit the large fiber bandwidth, and allow high-capacity and distance transmission of up to 164 channels modulated at 100 Gb/s over 2550 km, which corresponds to a capacity×distance product of 41.8 Pbit/s km.

In an implementation form, the optical network 200 is a Transparent Optical Transport Network. In transparent Optical Transport Networks (OTNs), the optical signal from a source to a destination is handled entirely in the optical domain meaning that Optical-Electrical-Optical (O-E-O) conversions are never performed at transit nodes. Full transparency, however, is not always achievable in long distance networks due to physical impairments, both linear and non-linear that degrade the Optical Signal-to-Noise Ratio (OSNR) as optical signals propagate transparently through the network.

In an implementation form, the optical network 200 comprises regenerators which are devices that regenerate the optical signal. In order to geographically expand a transparent OTN, an operator might need to install one or more regenerators along some paths, so as to provide sufficient end-to-end quality to optical connections. Clearly, regenerators break up the optical continuity, but allow improving the OSNR hence reducing the bit error rate (BER). The deployment of regenerators turns a transparent OTN into a translucent network.

In an implementation form, the optical network 200 comprises a Routing and Wavelength Assignment and Regenerator Placement (RWARP) mechanism. During the dimensioning of an OTN, the Routing and Wavelength Assignment and Regenerator Placement (RWARP) process requires an effective method for estimating the potential degradation of an optical signal along the candidate paths, which is typically achieved by integrating physical-layer information into the RWARP process. Once the regenerators are placed and the dimensioning phase has concluded, the role of the RWA process is to route the forecasted traffic demands according to the planning.

In an implementation form, the amplifiers 207_1, 207_2, 207_3 are inline optical amplifiers, in particular Erbium Doped Fiber Amplifiers. One limitation to system reach comes from fiber attenuation. Despite very low values of attenuation for wave-lengths around 1550 nm, about 0.2 dB/km, long-haul transmission, over a few hundreds of kilometers or more, is not feasible without optical amplification or regeneration. Therefore, inline optical amplifiers, mostly Erbium Doped Fiber Amplifiers, are generally deployed along the transmission link, on average every 80 km for terrestrial systems. They can amplify an optical field over a wide waveband such as the C-band (between 1530 and 1565 nm), without optoelectronic regeneration, and therefore allow much longer transmission reach for all the transmitted channels in the amplified waveband.

In an implementation form, the amplifiers 207_1, 207_2, 207_3 generate Amplified Spontaneous Emission (ASE) noise. After transmission over an amplified link, the accumulated ASE becomes the dominant source of noise.

In an implementation form, the optical fibers 209_1, 209_2, 209_3 are Single-Mode Fibers (SMF) according to the G.652 type of ITU-T (International Telecommunication Union-Telecommunication) standardization body.

In an implementation form, the optical fibers 209_1, 209_2, 209_3 are Large-Effective Area Fibers (LEAF) according to the G.655 Non-Zero Dispersion Shifted Fiber type of ITU-T.

In an implementation form, the optical link 205 comprises Dispersion Compensating Fibers (DCFs). Dispersion compensation is required, and is generally achieved with specific fiber sections called DCFs (Dispersion Compensating Fibers) exhibiting an opposite dispersion sign to the one of transmission fiber sections (also referred to as fiber spans) in the propagation waveband, so that the accumulated dispersion remains close to zero, thus enabling to minimize signal distortions. Those DCFs have typical dispersions of [−100; −250] ps/(nm/km) at 1550 nm and are located regularly along the line, within the inline amplifiers. The optical pulses carrying the digital information tend to broaden but the succession of fibers with different dispersion signs limits the broadening, and then the resulting inter-symbol interference at the receiver side.

In an implementation form, the optical link 205 is subject to non-linear impairments. Non-linear impairments can be divided into two categories, those stemming from electronic non-linearities, namely the Kerr effect, and those stemming from atomic/molecular/material non-linearities, namely Stimulated Brillouin Scattering (SBS), core electrostriction, and inter-channel Self-Induced Stimulated Raman Scattering (SI-SRS).

In an implementation form, the optical link 205 is subject to the Kerr effect. The Kerr effect translates the dependence of the instantaneous fiber refractive index $n(z,t)$ on the signal intensity $I(z,t)$. The intensity is related to the instantaneous power profile $P(z,t)$ via $I(z,t)=P(z,t)/A_{eff}$, $A_{eff}$ is the effective area of the fiber, which is fiber-type specific (80 μm² for SMF, 72 μm² for LEAF, 15-20 μm² for DCFs around 1550 nm). The magnitude of this effect is determined by the non-linear coefficient $n_2$, according to the relation $n(z,t)=n_0+n_2 P(z,t)/A_{eff}$, where $n_o$ is the linear part of the refractive index, while $n_2$ is expressed in m²/W. The non-linear index ranges between $n_2=2.5\times10^{-20}$ and $3.0\times10^{-20}$ m²/W. Kerr non-linearities can be categorized into four types of physical phenomena which are Self-Phase Modulation (SPM), Cross-Phase Modulation (XPM), Four-Wave Mixing (FWM) and Signal-Noise non-linear interactions. For 10/40G nonlinear transmission in G.652 fiber systems, since G.652 fibres have large chromatic dispersion and effective area, the FWM impairment can be neglected. According to Recommendation G. 663, the effects of SBS and SRS can also be neglected. SPM/XPM nonlinear impairments, however, have to be considered. In an implementation form, the fibers 209_1, 209_2, 209_3 are G.652 fibers according to ITU-T Recommendation G.652. In an implementation form, the effects of SBS and SRS are neglectable according to ITU-T G.663. In an implementation form, the optical network 200 comprises a G.652 fiber system.

In an implementation form, the optical link 205 is subject to SPM effects. The Self-Phase Modulation (SPM) describes the signal phase of a given channel being modulated proportionally to its own power. At the receiver end, the photodiode is phase-insensitive, but Group Velocity Dispersion (GVD) converts some of the phase modulation into intensity modulation, causing signal distortions. After propagation along a length L of fiber with attenuation α, the phase of a channel with power $P(z,t)$ impaired by SPM can be derived from the propagation equation according to the formula:

$$\Phi_{NL}(L,t) = \frac{2\pi}{\lambda}\int_0^L \frac{n_2(z)}{A_{eff}(z)} P(z,t) dt$$

For typical WDM systems, the presence of amplifiers leads to an accumulation of SPM effects and phase shifts along the link. SPM causes a broadening of the optical spectrum.

In an implementation form, the optical link 205 is subject to cross-phase modulation. The Cross-Phase Modulation (XPM) describes the signal phase of a given channel being modulated proportionally to the power of the other channels, especially the close neighbors of this channel. Group Velocity Dispersion (GVD) converts some of the phase modulation into intensity modulation, causing signal distortions.

In an implementation form, the optical link 205 is subject to Four-Wave Mixing. The Four-Wave Mixing describes the interaction between three WDM channels at three different wavelengths results into the generation of an intermodulation product at a fourth wavelength, which can fall on top of an existing fourth channel, producing detrimental crosstalk.

In an implementation form, the optical link 205 is subject to Signal-Noise nonlinear interactions. The Signal-Noise nonlinear interactions, also called Parametric-Gain or Modulation-Instability for intensity-modulated systems, describe non-linear phase noise for phase-modulated systems, which strengthens or reduces the impact of amplifier noise, depending on the chromatic dispersion.

In an implementation form, the optical link 205 is subject to linear impairments. Linear impairments result from filtering due to optical nodes, chromatic dispersion (CD), insertion loss, amplified spontaneous emulation (ASE) noise, crosstalk, polarization mode dispersion (PMD), polarization dependent loss (PDL). For linear transmission, i.e. the launch power of the optical signal is low enough that none of the non-linear impairments in optical fibers is taking effect, the impact of the linear impairments on the signal quality is relatively easy to be modelled. For example, the impact of CD can be modelled by considering the total residual CD at the end of the transmission link; the impact of PMD can also be modelled by considering the total accumulated PMD at the end of the transmission link.

In an implementation form, the optical link 205 is subject to linear impairments by filtering effects. For linear transmission, the concatenation of the filters in the network results in a narrower transmission window and therefore causes transmission penalty, also called linear impairments by filtering effects. For non-linear transmission, the nonlinear effects SPM/XPM can broaden the optical spectrum of the transmitted signal, the transmission penalty is enlarged because more part of the optical spectrum is filtered out.

In an implementation form, the optical link 205 is subject to Polarization Mode Dispersion (PMD). Polarization Mode Dispersion is a linear impairment. PMD causes the pulse broadening and induces signal penalty. The effects of SPM/XPM differ for different polarizations. Usually, if one channel keeps its polarization state (e.g. linear polarization), then it incurs the largest SPM effect. For WDM transmission, if all the channels have the same linear polarization states, then the multi-channel nonlinear effects XPM will also have the largest impact. However, in a real fiber, the polarization states of the optical signals change randomly due to PMD, therefore the strength of the nonlinear effects is reduced and then the signal degrades less.

In an implementation form, the optical link 205 is subject to Chromatic Dispersion (CD). Chromatic Dispersion stems from Group Velocity Dispersion (GVD). The effect of the total residual CD at the end of the transmission link depends on the accumulated nonlinear effects along the transmission link. In general, the CD tolerance after transmission is smaller than the one of back to back. The deviation of the CD can be represented by the difference between the actual CD and the targeted (ideal) CD of each span. Due to the interplay of CD and nonlinear effects along the transmission link, their effects vary.

In an implementation form, the optical link 205 is subject to Group Velocity Dispersion (GVD). Group Velocity Dispersion characterizes wavelength dependence of fiber refractive index $n(\lambda)$. It is the linear phenomenon by which the spectral components of a signal are carried by guided modes which have different speeds. They therefore arrive delayed with respect to each other at the receiver end, thus distorting the original signal waveform and increasing the number of decision errors. Fiber GVD is usually characterized with the dispersion parameter per unit length expressed in ps/(nm/km). The typical dispersion characteristics of the two most widely available fiber types are 17 ps/(nm/km) at 1550 nm for standard SMF (Single-Mode Fiber, G.652 type according to ITU-T (International Telecommunication Union-Telecommunication) standardization body) and 4 ps/(nm/km) at 1550 nm (2.6 ps/(nm/km) at 1530 nm) for LEAF™ fiber (Large-Effective Area Fiber, G.655 Non-Zero Dispersion Shifted Fiber type). The net impact of chromatic dispersion after propagation naturally depends on the accumulated dispersion (ps/nm) along all fiber sections.

The method comprises collecting 101 information of the optical link; determining 103 a configuration parameter $P_{conf}$ of the optical link based on the information of the optical link; adjusting 105 the configuration parameter $P_{conf}$ to an adjusted configuration parameter $P'_{conf}$ according to linear impairments in the optical link; and determining 107 the optical signal-to-noise ratio penalty based on a non-linear function of the adjusted configuration parameter $P'_{conf}$ accounting for non-linear impairments in the optical link.

Depending on the real system, for example, dispersion compensated or dispersion un-compensated links, modulation formats, bit rates, etc., and its implementation, the non-linear function of the adjusted configuration parameter $P'_{conf}$ accounting for non-linear impairments in the optical link will be different. In an implementation form, the non-linear function reads: $f(N_{span}, P_i, P'_{conf})$, depending on a number $N_{span}$ of spans between two amplifiers, a signal launching power $P_i$ and an adjusted configuration parameter $P'_{conf}$.

In an implementation form, the optical network comprises a 100GPDM-QPSK dispersion uncompensated WDM system, in which the non-linear function reads:

$$f(N_{span}, P_i, P'_{conf}) = 0.05(\Sigma_N Pi - P'conf)^2 + 0.4347 * (\Sigma_N Pi - P'conf) + 1.$$

With the exemplary values of N=20, $P_i$=1 dBm, P'conf=16 dBm, the OSNR penalty is 0.33 dB.

The value of $P_{conf}$ is depending on multiple factors like fiber type, number of channels, channel spacing, etc. For a given set up, the $P_{conf}$ can be measured or simulated based on the definition. In an exemplary embodiment, in G.652 fiber, for 40G DQPSK WDM system with 50 GHz spacing, the $P_{conf}$ value is about 16.6 dBm.

The method comprises adjusting the configuration parameter $P_{conf}$ to an adjusted configuration parameter $P'_{conf}$ according to linear impairments in the optical link. In an implementation form, the adjusting $\Delta P_f$ is related to the filtering within the optical link. The adjustment $\Delta P_f$ is system setup related. In practice, the relationship of $\Delta P_f$ with the filtering bandwidth can be measured or simulated. In an exemplary implementation form, in G.652 fiber, 40G DQPSK WDM system with 50 GHz spacing, including a ROADM composed of 2WSS with 45 GHz FWHM (full width at half maximum), the $\Delta P_f$ is 0.5 dB.

In an implementation form, the adjusting $\Delta P_{PMD}$ is related to the accumulated polarization mode dispersion along the optical link. The adjustment $\Delta P_{PMD}$ is also system setup related. In practice, the relationship of $\Delta P_{PMD}$ with the accumulated PMD can be measured or simulated. In an exemplary implementation form, in G.652 fiber, 40G DQPSK WDM system with 50 GHz spacing, the total accumulated PMD is 5 ps and the $\Delta P_{PMD}$ is 0.7 dB.

In an implementation form, the adjusting $\Delta P_{CD}$ is related to the accumulated chromatic dispersion along the optical link. The adjustment $\Delta P_{CD}$ is especially depending on the total accumulated dispersion of the link. For compensated link, since the total accumulated dispersion is usually compensated to close to 0, then $\Delta P_{CD}$ usually is 0. However, in the uncompensated link, $\Delta P_{CD}$ needs to be measured or simulated based on the system setup. In general, higher accumulated dispersion and larger number of spans will have higher $P_{conf}$. In an exemplary implementation form, in G.652 fiber, 100G PDM-QPSK coherent WDM system with 50 GHz spacing, span length is 80 km, when the number of spans is 10, $P_{conf}$ is 11.6 dBm, when the number of spans is 20, then $P_{conf}$ is 13.1 dBm, and the $\Delta P_{CD}$ is 1.5 dB.

Figure 2:
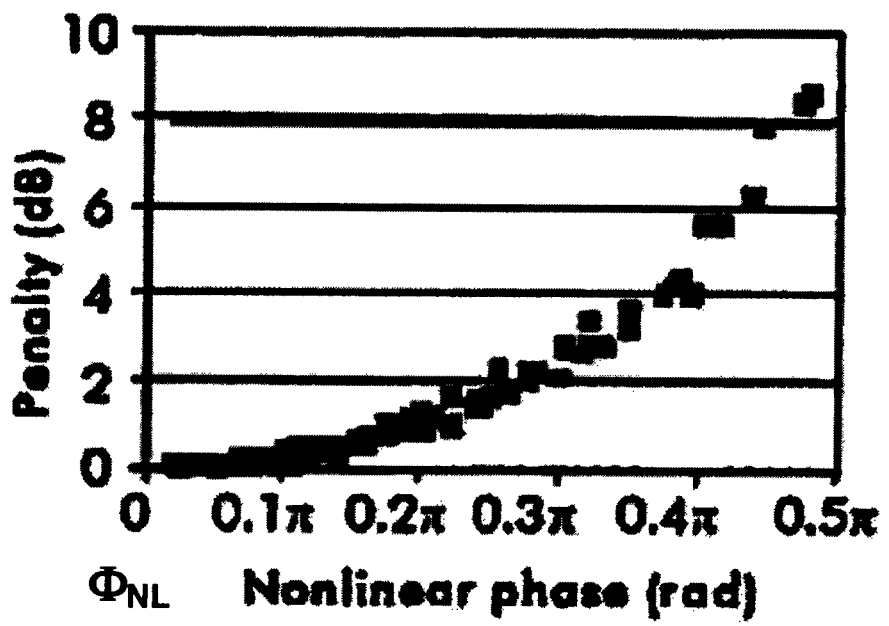
FIG. 2 shows a diagram and a formula illustrating a non-linear function with respect to non-linear phase shift effects according to an implementation form.

FIG. 2 shows a diagram and a formula illustrating a non-linear function with respect to non-linear phase shift effects according to an implementation form. The diagram illustrates the relation between the non-linear phase of an optical link impaired by Self Phase Modulation (SPM) effects and the OSNR penalty according to an implementation form.

After propagation along a length L of the fiber with attenuation $\alpha$, the phase of a channel with power P(z,t) impaired by SPM can be derived from the propagation equation according to the formula:

$$\Phi_{NL}(L, t) = \frac{2\pi}{\lambda} \int_0^L \frac{n_2(z)}{A_{eff}(z)} P(z, t) dt$$

The accumulated nonlinear phase shift and its variation is used as an effective parameter for signal quality prediction. For example, if a transmission link is spanned of a number of i standard single mode fibers (SSMF) and dispersion compensation fibers (DCF), the accumulated nonlinear phase shift is $$\Phi_{NL(total)} = \sum_{span=1}^{i} \frac{2\pi}{\lambda} \left( \frac{n_2 P_i L_{eff}}{A_{eff}} \bigg|_{Line} + \frac{n_2 P_i L_{eff}}{A_{eff}} \bigg|_{DCF} \right),$$

where $\lambda$ is the wavelength, $P_i$ is the launch power, $n_2$ is the nonlinear coefficient, $A_{eff}$ is the fiber effective area, and $L_{eff}$ is the fiber effective length. Then the signal quality Q penalty can be represented by the curves shown in FIG. 2.

For typical WDM systems, the presence of amplifiers leads to an accumulation of SPM effects and phase shifts along the link. SPM causes a broadening of the optical spectrum, since optical frequency shifts are generated on the pulse leading and trailing edges. Since this effect primarily concerns the signal phase, it does not affect intensity detection when chromatic dispersion is close to zero. In the case of non-zero chromatic dispersion, the interplay between SPM and chromatic dispersion results in a complicated phase-to-intensity conversion during signal propagation. Depending upon the chromatic dispersion sign, SPM is either beneficial, i.e. leading to pulse compression, or detrimental, i.e. leading to pulse broadening, distortion and irreversible breakup. The interplay between SPM and chromatic dispersion is of complex nature, as SPM generates phase modulation of the signal in the temporal domain, while chromatic dispersion meanwhile leads to phase modulation of the signal, but in the frequency domain. Consequently, the outcome of the interaction between non-linear and dispersive effects strongly depends on the distribution of dispersion compensation and signal power along a transmission link. In presence of non-linearities, Dispersion Management consists in the clever distribution of dispersive elements along the link, so as to mitigate as much as possible non-linear and dispersive effects at the same time.

In order to determine a quality of the link, a management tool collects the link information that the signal transmits including fiber parameters, number of channels, channel launching powers, number of optical nodes, etc. From the collected link information, a parameter $P_{conf}$ (in dB), corresponding to the accumulated power along the link which causes a predetermined OSNR penalty at a predetermined bit error rate, for example 1 dB OSNR penalty at a bit error rate (BER) 1e-3, can be decided. The OSNR penalty, defined as the additional optical signal to noise ratio (OSNR) required after transmission compared with back to back (BtB) for the BER 1e-3, can be represented as the function of $N_{span}$, number of spans, and $P_i$, the channel launch power at $i^{th}$ fiber, and $P_{conf}$ i.e. OSNR_Penalty=$f(N_{span}, P_i, P_{conf})$. FIG. 2 shows a diagram of the OSNR penalty according to the formula:

$$OSNR\_Penalty = f(N_{span}, P_i, P_{conf}) \qquad 1$$
$$= f(N_{span} = i, \lambda, P_i, n_2, A_{eff}, L_{eff}).$$

where $N_{span}$=i is the number of spans, $P_i$ is the launch power and $P_{conf}$ describes the link parameters including $\lambda$ which is the wavelength, $n_2$ which is the nonlinear coefficient, $A_{eff}$ which is the fiber effective area, and $L_{eff}$ which is the fiber effective length.

Due to PMD effects in the fibers or optical components, or optical nodes in the transmission link, linear and nonlinear impairments interact. According to the accumulated PMD and final filtering bandwidth from the optical nodes, $P_{conf}$ is adjusted to $P'_{conf}$.

Depending on the number of reconfigurable optical add and drops (ROADMs) and/or optical cross connects (OXCs) and their types, the management tool calculates the corresponding equivalent final filtering bandwidth, and then the parameter $P_{conf}$ is adjusted to $P'_{conf}=P_{conf}-\Delta P_f$, where $\Delta P_f$ is the adjustment related to the final filtering bandwidth.

Depending on the accumulated PMD in the transmission link, the management tool adjusts the parameter $P_{conf}$ to $P'_{conf}=P_{conf}+\Delta P_{PMD}$, where $\Delta P_{PMD}$ is the adjustment related to the accumulated PMD in the link.

Then the final OSNR Penalty is represented as $$OSNR\_Penalty = f(N_{span}, P_i, P'_{conf}) + Penalty_{filters} + \qquad 1.$$
$$Penalty_{PMD}$$
$$= f(N_{span} = i, \lambda, P_i, n_2, A_{eff}, L_{eff}) +$$
$$Penalty_{filters} + Penalty_{PMD}.$$

$Penalty_{filters}$ and $Penalty_{PMD}$ are the linear OSNR penalties caused by cascaded filters and accumulated PMD along the link, respectively, and they can be measured beforehand. In an implementation form, $Penalty_{PMD}$ is determined according to the description below with respect to FIG. 3. In an implementation form, $Penalty_{filters}$ is determined according to the specifications in ITU-T Recommendation G.680.

Figure 3:
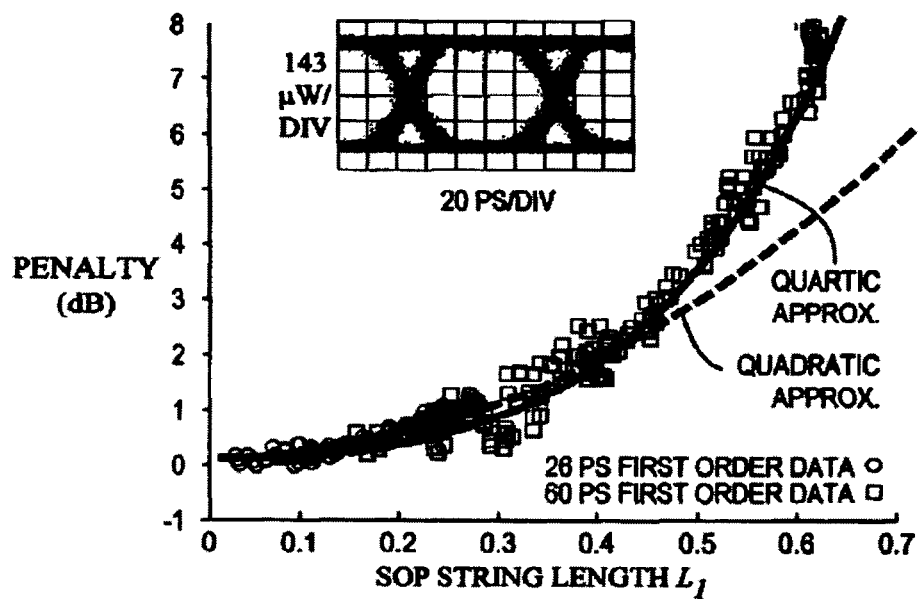
FIG. 3 shows a diagram and a formula illustrating linear impairments with respect to PMD effects according to an implementation form.

FIG. 3 shows a diagram and a formula illustrating linear impairments with respect to PMD effects according to an implementation form. The diagram and the formula illustrate the relation between a state of polarization (SOP) string length of an optical link and an OSNR penalty ($Penalty_{PMD}$).

PMD can be characterized by the PMD vector $\tau(\omega)$, which may be expanded in a Taylor series about the signal's center frequency. The first term of the expansion, known as first order PMD is the differential group delay (DGD) between the two principal states of polarization (PSPs). DGD is considered to be the dominant mechanism for PMD induced system impairment.

The PMD-induced OSNR penalty is approximated to the first order by the following equation:

$$\varepsilon(\vec{\tau}) = A_{0\gamma}(1-\gamma)\left(\frac{\tau}{T}\right)^2,$$

wherein $\varepsilon$ is the PMD-induced OSNR penalty, also denoted as $Penalty_{PMD}$, vector $\tau$ is the PMD vector at the input, $A_0$ is a modulation format specific constant, $\gamma$ is the splitting ratio between the two PSPs, $\tau$ is the differential group delay (DGD) and T is the bit period.

The PMD-induced OSNR penalty can be rewritten in terms of the length of an SOP trace on the Poincare sphere as the frequency moves across the modulation bandwidth 1/T. This string is a measurable quantity which represents the depolarization of a signal, and can be separated from other impairments affecting the signal performance. The first order approximation for this string length is given by $$L_1 = (\tau/T)\sin\Theta$$

in which $\theta$ is the angle between the PSP and the launch SOP. This first order approximation can be rewritten to show that the penalty $\varepsilon$ is related to the string length $L_1$ through a quadratic relationship:

$$\varepsilon = \frac{A_0}{4}L_1^2$$

Since the string length L1 can be determined either directly from spectrally resolved polarimetry, or by measuring $\theta$ and $\tau$, FIG. 3 compares the results for the two first order PMD fibers, with DGDs of 26 ps and 60 ps. The coefficient $A_0$ was extracted from the lower bound of the 26 ps data and found to be $A_0$=49.6. The corresponding penalty is shown as a dashed line. While the fit is good at small string lengths, the 60 ps results at higher string lengths show a strong deviation. Instead, this data is well fitted by the quartic polynomial:

$$\epsilon = AL_1^2/4 + BL_1^4$$

The quartic polynomial includes a higher order term. A best fit for the lower bound may be obtained with A=40 and B=36.

In an implementation form, the Penalty$_{PMD}$ caused by accumulated PMD along the link is expressed according to a first approximation as $$\text{Penalty}_{PMD} = A_0/4L_1^2. \qquad 1.$$

In an implementation form, the Penalty$_{PMD}$ caused by accumulated PMD along the link is expressed according to a second approximation which is more precise than the first approximation as $$\text{Penalty}_{PMD} = A/4L_1^2 + BL_1^4. \qquad 1.$$

Figure 4:
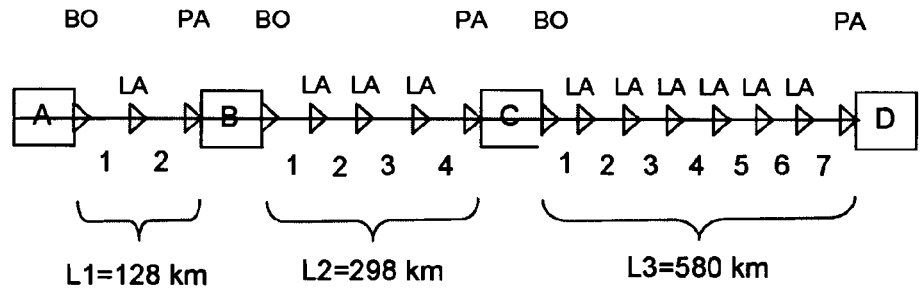
FIG. 4 shows a block diagram of an optical link comprising multiple optical nodes and optical amplifiers and a non-linear function describing non-linear transmission effects according to an implementation form.

Both approximations may be used as the term for the PMD induced system penalty Penalty$_{PMD}$ in the equations described with respect to FIGS. 2 and 4.

FIG. 4 shows a block diagram of an optical link comprising multiple optical nodes and optical amplifiers and a formula for calculating the quality of the optical link according to an implementation form.

An exemplary optical link comprises four optical nodes A, B, C and D and multiple numbers of amplifiers in the signal paths between the nodes. The first path $L_1$ between optical nodes A and B has a length of 128 km, the second path $L_2$ between optical nodes B and C has a length of 298 km, the third path $L_3$ between optical nodes C and D has a length of 580 km. Each optical node comprises a pre-amplifier (PA) and a booster (BO) for amplifying the optical signal. Line amplifiers (LA) are arranged between the optical nodes. When a maximum span length of 85 km is specified corresponding to a maximum amplifier distance, the first path $L_1$ requires two spans and one line amplifier (LA) between the two spans. Accordingly, the second path $L_2$ requires four spans and three line amplifier (LA) between the four spans and the third path $L_3$ requires seven spans and six line amplifier (LA) between the seven spans. In total, a number of spans $N_{SPAN}=2+4+7=13$ results from this configuration.

A quality factor $Q_{end}$ can be evaluated as a function of the transmission system parameters and the transmission impairments. Without any error correction mechanism on the digital signal at the receiver, a quality factor $Q_{end}=16.9$ dB corresponds to a BER of approximately $1\times10^{-12}$. Typically, the requirements for the minimum value of $Q_{end}$ of a signal at the receiver are about 17 dB without error correction, and 12 dB in case of error correction. The expression used for evaluating the quality factor $Q_{end}$ at the endpoint of a transparent path (or sub-path) is given as $$Q_{end} = a_0 + a_1 \text{OSNR}_{end} + a_2 N_{SPAN} + a_3 (P_0 N_{SPAN})^B$$

The quality factor $Q_{end}$ depends both on linear and non-linear effects. The OSNR$_{end}$ factor is the optical signal to noise ratio expressed in dB at the receiver. The output lightpath (or sub-path) OSNR can be calculated considering the OSNR across each of its elementary components and then combining the partial results. The elementary components include all the spans and the nodes along the (sub-) path. The terms $a_2 N_{SPAN}$ and $a_3(P_0 N_{SPAN})^B$ take into account the non-linear effects, considering all amplifiers along an optical link (booster at the beginning of the line and line amplifiers at intermediate sites on the lines). $N_{SPAN}$ is the number of spans of the transparent path (a span is the portion of a link between two amplifiers), and $P_0$ [dBm] is the power level at the signal launch (typically 3 dBm). The coefficients $a_0$, $a_1$, $a_2$, $a_3$, and B, on the other hand, depend on the type of line systems used and should be timed by an on-field measurement campaign. Typical values are suggested as: $a_0=0,4$, $a_1=1$, $a_2=0,04$, $a_3=0,02$ and B=0,2.

In order to determine the quality of the link, a management tool collects the link information that the signal transmits including fiber parameters, number of channels, channel launching powers, number of optical nodes, etc. From the collected link information, a parameter $P_{conf}$ (in dB), corresponding to the accumulated power along the link which causes a predetermined OSNR penalty at a predetermined bit error rate, for example 1 dB OSNR penalty at a bit error rate (BER) 1e-3, can be decided. The OSNR penalty, defined as the additional optical signal to noise ratio (OSNR) required after transmission compared with back to back (BtB) for the BER 1e-3, can be represented as the function of $N_{spam}$, number of spans, and $P_i$, the channel launch power at $i^{th}$ fiber, and $P_{conf}$, i.e. OSNR_Penalty=$f(N_{span}, P_i, P_{conf})$. FIG. 4 shows a diagram of the OSNR penalty according to the formula:

$$\text{OSNR\_Penalty} = f(N_{span}, P_0, P_{conf}) \qquad 1$$
$$= f(N_{span}, P_0, a_0, a_1, a_2, a_3, \text{OSNR}_{ends}, B).$$

where $N_{spam}=i$ is the number of spans, $P_0$ is the launch power and $P_{conf}$ describes the link parameters including $a_0$, $a_1$, $a_2$, $a_3$, and B, which depend on the type of line systems used and should be tuned by off-line on-field measurements. Exemplary values are $a_0=0,4$, $a_1=1$, $a_2=0,04$, $a_3=0,02$ and B=0,2.

Due to PMD effects in the fibers or optical components, or optical nodes in the transmission link, linear and nonlinear impairments interact. According to the accumulated PMD and final filtering bandwidth from the optical nodes, $P_{conf}$ is adjusted to $P'_{conf}$.

Depending on the number of reconfigurable optical add and drops (ROADMs) and/or optical cross connects (OXCs) and their types, the management tool calculates the corresponding equivalent final filtering bandwidth, and then the parameter $P_{conf}$ is adjusted to $P'_{conf}=P_{conf}-\Delta P_f$, where $\Delta P_f$ is the adjustment related to the final filtering bandwidth.

Depending on the accumulated PMD in the transmission link, the management tool adjusts the parameter $P_{conf}$ to $P'_{conf}+\Delta P_{PMD}$, where $\Delta P_{PMD}$ is the adjustment related to the accumulated PMD in the link.

Then the final OSNR Penalty is represented as $$\text{OSNR\_Penalty} = f(N_{span}, P_0, P_{conf}) + \text{Penalty}_{filters} + \qquad 1$$
$$\text{Penalty}_{PMD}$$
$$= f(N_{span}, P_0, a_0, a_1, a_2, a_3, \text{OSNR}_{ends}, B) +$$
$$\text{Penalty}_{filters} + \text{Penalty}_{PMD}. \qquad 2$$

Penalty$_{filters}$ and Penalty$_{PMD}$ are the linear OSNR penalties caused by cascaded filters and accumulated PMD along the link, respectively, and they can be measured beforehand. The resulting OSNR_Penalty is a measure for the quality of the optical link.

Figure 5:
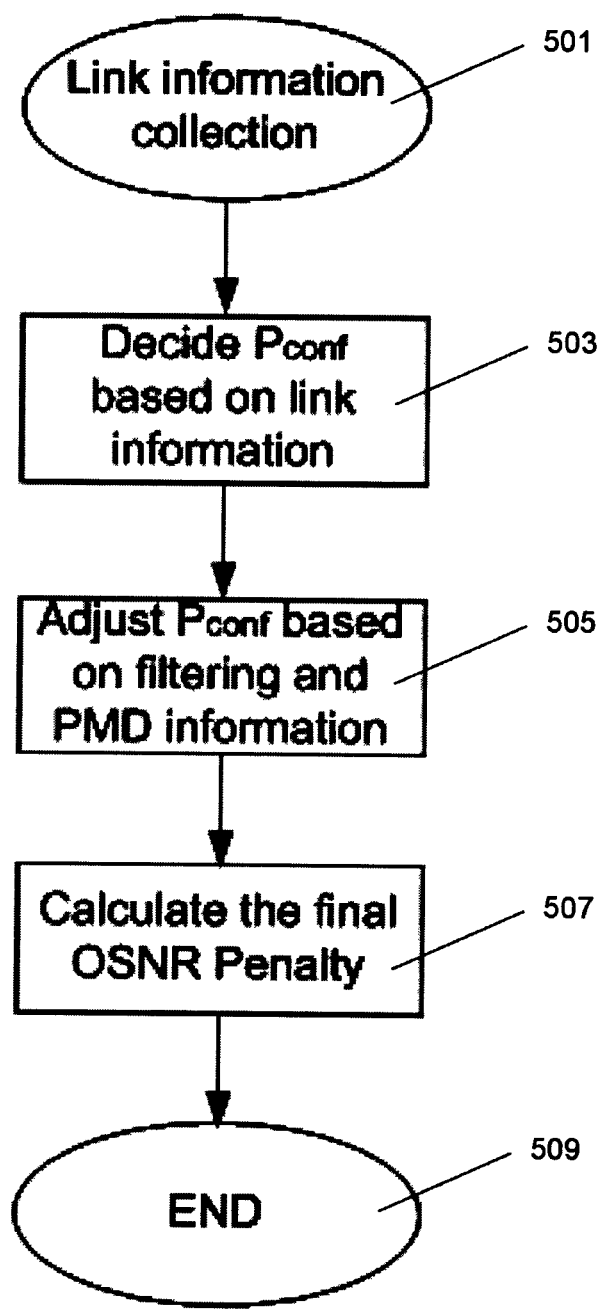
FIG. 5 shows a block diagram of a method for determining an optical signal-to-noise ratio penalty in an optical network according to an implementation form.

FIG. 5 shows a block diagram of a method for determining an optical signal-to-noise ratio penalty in an optical network according to an implementation form.

The method comprises a collecting 501 of link information, a deciding 503 of configuration parameters $P_{conf}$ based on the link information, an adjusting 505 of the configuration parameters $P_{conf}$ based on filtering and PMD information and a calculating 507 of the final OSNR Penalty. Then the method ends 509.

Figure 6:
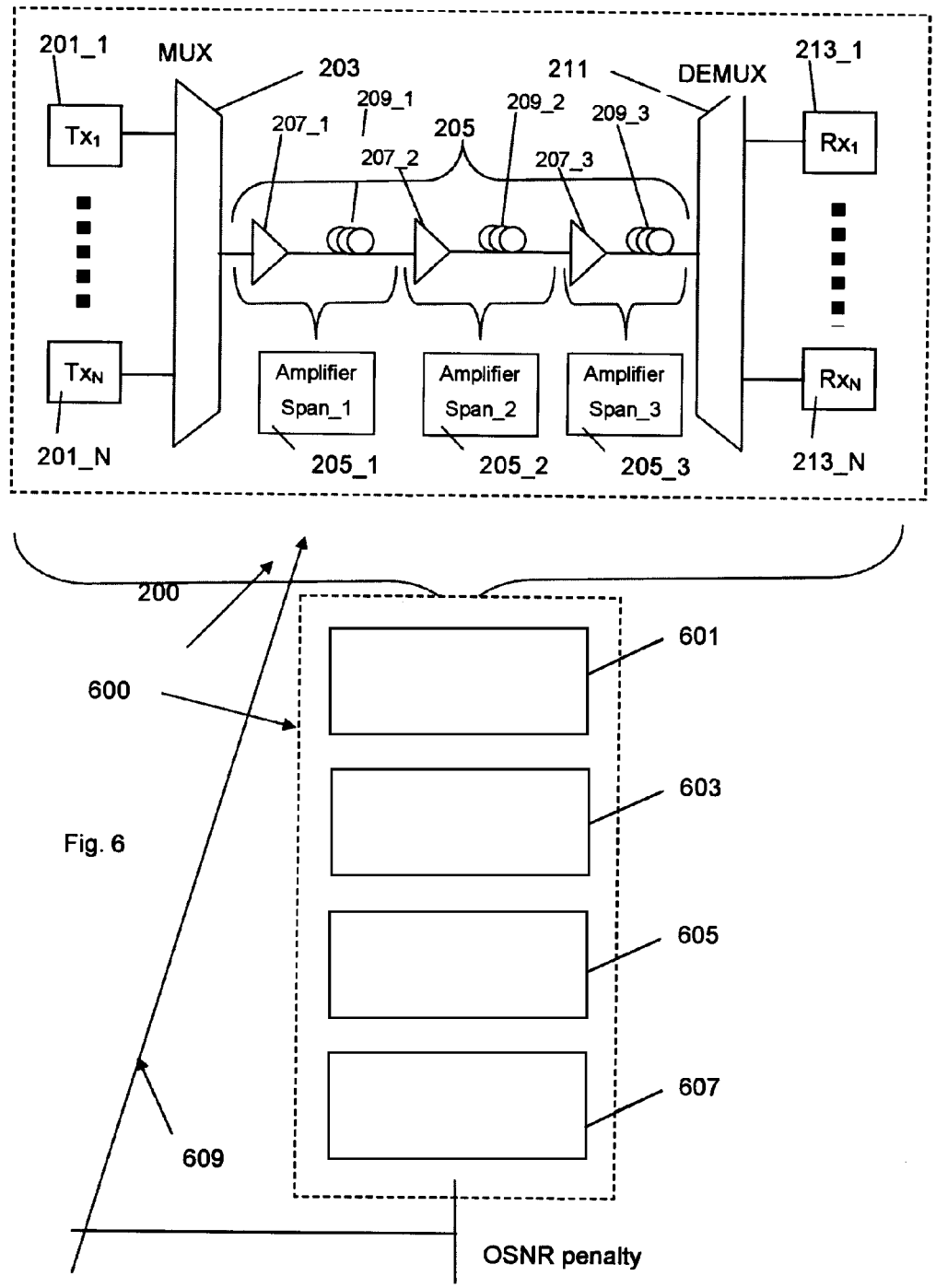
FIG. 6 shows a block diagram of a apparatus for determining an optical signal-to-noise ratio penalty in an optical network according to an implementation form.

The collecting 501 may correspond to a collecting 101 as described with respect to FIG. 1, the deciding 503 may correspond to a determining 103 as described with respect to FIG. 1, the adjusting 505 may correspond to an adjusting 105 as described with respect to FIG. 1 and the calculating 507 may correspond to a determining 107 as described with respect to FIG. 1, FIG. 6 shows a block diagram of a apparatus 600 for determining an optical signal-to-noise ratio penalty (OSNR penalty) in an optical network 200 according to an implementation form. The optical signal-to-noise ratio penalty is a measure for a quality of an optical signal transmitted via an optical link 205 between a source optical node and a destination optical node in an optical network 200. The optical network 200 corresponds to the optical network 200 described with reference to FIG. 1.

The apparatus 600 comprises a collecting unit 601, a first determining unit 603, an adjusting unit 605 and a second determining unit 607. The collecting unit 201 is configured for collecting information of the optical link. The first determining unit 203 is configured for determining a configuration parameter $P_{conf}$ of the optical link based on the information of the optical link. The adjusting unit 205 is configured for adjusting the configuration parameter $P_{conf}$ to an adjusted configuration parameter $P'_{conf}$ according to linear impairments in the optical link. The second determining unit 207 is configured for determining the optical signal-to-noise ratio penalty (OSNR penalty) based on a non-linear function of the adjusted configuration parameter $P'_{conf}$ accounting for non-linear impairments in the optical link.

In an implementation form, the collecting unit 601 performs a collecting according to the collecting 101 described with respect one of the previous figures. In an implementation form, the first determining unit 603 performs a determining according to the determining 103 described with respect one of the previous figures. In an implementation form, the adjusting unit 605 performs an adjusting according to the adjusting 105 described with respect one of the previous figures.

In an implementation form, the second determining unit 607 performs a determining according to the determining 107 described with respect one of the previous figures.

In an implementation form, the apparatus 600 provides configuration information 609 for configuring an optical link 205 within the optical network 200 by using wavelength division multiplexed channels, optical fibers and optical nodes of the optical network 200 such that the optical signal-to-noise ratio penalty is below a threshold. In an implementation form, the threshold is such that the optical signal-to-noise ratio penalty corresponds to a minimum OSNR penalty.

To account for non-noise system impairments, the notion of OSNR penalty is used. For a reference Bit Error Rate (BER), it represents the excess OSNR required after transmission to get this reference BER, with respect to the requirements in the so-called "back-to-back" configuration, i.e. when transmitter and receiver are directly connected, without transmission. In other words, the OSNR penalty is the difference in sensitivity (in dB scale) after and before transmission for the same reference BER.

In an implementation form, the optical signal-to-noise ratio penalty is minimized when switching of optical cross connects into the optical link 205 and/or reconfiguration of reconfigurable optical add and drops within the optical link 205 is based on the configuration information 609. The configuration information 609 is such that an operator can design the optical network 200 in order to provide a minimum OSNR penalty.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the spirit and scope of the present invention. It is therefore to be understood that within the scope of the appended claims and their equivalents, the inventions may be practiced otherwise than as specifically described herein.

The invention claimed is:

1. A method for determining an optical signal-to-noise ratio penalty, the method comprising:
   collecting information of an optical link between a source optical node and a destination optical node in an optical network, the optical link transmitting an optical signal;
   determining a configuration parameter $P_{conf}$ of the optical link based on the information of the optical link;
   adjusting the configuration parameter $P_{conf}$ to an adjusted configuration parameter $P'_{conf}$ according to linear impairments in the optical link; and
   determining the optical signal-to-noise ratio penalty based on a non-linear function of the adjusted configuration parameter $P'_{conf}$, the non-linear function accounting for non-linear impairments in the optical link.

2. The method of claim 1, wherein the configuration parameter $P_{conf}$ of the optical link corresponds to an accumulated power along the optical link causing a predetermined degradation of the optical signal.

3. The method of claim 2, wherein the predetermined degradation of the optical signal corresponds to a predetermined optical signal-to-noise ratio penalty at a predetermined bit error rate.

4. The method of claim 1, wherein the optical signal-to-noise ratio penalty is determined as an additional optical signal-to-noise ratio of the optical signal required after transmission of the optical signal via the optical link compared to a back-to-back transmission of the optical signal.

5. The method of claim 1, wherein
   the optical signal-to-noise ratio penalty is determined based on the non-linear function of the adjusted configuration parameter $P'_{conf}$ and based on the linear impairments in the optical link.

6. The method of claim 1, wherein the information of the optical link comprises fiber parameters of optical fibers in the optical link, a number of wavelength division multiplexed channels in the optical link, a number of optical nodes in the optical link and launching powers of the wavelength division multiplexed channels.

7. The method of claim 1, wherein the linear impairments comprise at least one of:

impairments due to filtering within the optical link,
impairments due to polarization mode dispersion along the optical link,
impairments due to chromatic dispersion along the optical link,
impairments due to insertion loss,
impairments due to amplified spontaneous emulation noise,
impairments due to crosstalk, or
impairments due to polarization dependent loss.

8. The method of claim 1, wherein the non-linear function of the adjusted configuration parameter $P'_{conf}$ accounts for at least on of:
non-linear impairments due to self-phase modulation,
non-linear impairments due to cross-phase modulation,
non-linear impairments due to four-wave mixing,
non-linear impairments due to stimulated Brillouin scattering, or
non-linear impairments due to stimulated Raman scattering.

9. The method of claim 1, wherein
the optical link comprises optical fibers according to ITU-T recommendation G.652.

10. The method of claim 1, wherein the optical link comprises regenerators and spans which are portions of the optical link between two regenerators; and wherein
the non-linear function of the adjusted configuration parameter $P'_{conf}$ depends on the adjusted configuration parameter $P'_{conf}$, on a number of the spans $N_{span}$ and on a power level $P_i$ at a launching of the optical signal.

11. The method of claim 10, wherein
the optical signal-to-noise ratio penalty is determined according to a formula:

$$OSNR\_Penalty = f(N_{span}, P_i, P'_{conf}) + Penalty_{filters} + Penalty_{PMD},$$

wherein OSNR_Penalty defines the optical signal-to-noise ratio penalty, f( ) the non-linear function, $N_{span}$ the number of spans, $P_1$ the power level at the launching of the optical signal, $P'_{conf}$ the adjusted configuration parameter, $Penalty_{filters}$ the linear impairments due to filtering within the optical link and $Penalty_{PMD}$ the linear impairments due to accumulated polarization mode dispersion.

12. The method of claim 1, wherein the adjusting the configuration parameter $P_{conf}$ comprises at least one of:
subtracting an adjustment $\Delta P_f$ related to filtering within the optical link from the configuration parameter $P_{conf}$,
adding an adjustment $\Delta P_{PMD}$ related to an accumulated polarization mode dispersion along the optical link to the configuration parameter $P_{conf}$, or
adding an adjustment $\Delta P_{CD}$ related to an accumulated chromatic dispersion along the optical link to the configuration parameter $P_{conf}$.

13. A machine for determining an optical signal-to-noise ratio penalty as a measure for a quality of an optical signal transmitted via an optical link between a source optical node and a destination optical node in an optical network, the machine comprising:
a processor coupled to a memory;
wherein the processor is programmed to:
collect information of the optical link;
determine a configuration parameter $P_{conf}$ of the optical link based on the information of the optical link;
adjust the configuration parameter $P_{conf}$ to an adjusted configuration parameter $P'_{conf}$ according to linear impairments in the optical link; and
determine the optical signal-to-noise ratio penalty based on a non-linear function of the adjusted configuration parameter $P'_{conf}$, the non-linear function accounting for non-linear impairments in the optical link.

14. The machine of claim 13, providing configuration information for configuring an optical link within the optical network by using wavelength division multiplexed channels, optical fibers and optical nodes of the optical network such that the optical signal-to-noise ratio penalty is below a threshold.

15. The machine of claim 14, wherein the optical signal-to-noise ratio penalty is minimized when switching of optical cross connects into the optical link and/or reconfiguration of reconfigurable optical adds and drops within the optical link is based on the configuration information.

16. A system comprising:
an optical link between a source optical node and a destination optical node;
a management tool communicably coupled to the optical link, wherein the management tool further comprises:
a collecting unit communicably coupled to the optical link and configured to collect information from the optical link;
a first determining unit communicably coupled to the collecting unit, the first determining unit configured to determine a configuration parameter $P_{conf}$ of the optical link based on the information from the optical link;
an adjusting unit communicably coupled to the first determining unit to receive the configuration parameter $P_{conf}$ of the optical link and configured to adjust the configuration parameter $P_{conf}$ of the optical link to an adjusted configuration parameter $P'_{conf}$ according to linear impairments in the optical link; and
a second determining unit communicably coupled to the adjusting unit and configured to determine a signal-to-noise ratio penalty based on a non-linear function of the adjusted configuration parameter $P'_{conf}$, the non-linear function accounting for non-linear impairments in the optical link.

17. The system of claim 16, providing configuration information for configuring an optical link within the optical network by using wavelength division multiplexed channels, optical fibers and optical nodes of the optical network such that the optical signal-to-noise ratio penalty is below a threshold.

18. The system of claim 16, wherein the optical signal-to-noise ratio penalty is minimized when switching of optical cross connects into the optical link and/or reconfiguration of reconfigurable optical adds and drops within the optical link is based on the configuration information.

19. The system of claim 16, wherein the configuration parameter $P_{conf}$ of the optical link corresponds to an accumulated power along the optical link causing a predetermined degradation of the optical signal.

20. The system of claim 16, wherein the information from the optical link comprises fiber parameters of optical fibers in the optical link, a number of wavelength division multiplexed channels in the optical link, a number of optical nodes in the optical link and launching powers of the wavelength division multiplexed channels.

* * * * *